United States Patent Office 3,092,526
Patented June 4, 1963

3,092,526
AMMONIUM PERCHLORATE RESIN BASE PROPELLANTS
Joseph Philipson, Temple City, Calif., assignor, by mesne assignments, to Aerojet-General Corporation, Cincinnati, Ohio, a corporation of Ohio
No Drawing. Filed Feb. 5, 1951, Ser. No. 209,508
15 Claims. (Cl. 149—19)

This invention relates to jet propulsion and particularly to rapid burning, ammonium perchlorate-resin base propellant charges.

An object of this invention is to provide a composite resin base, solid propellant charge that has a relatively high burning rate.

A further object of this invention is to provide a solid propellant that does not produce an appreciable amount of solid particles in the combustion gases.

In copending application Serial No. 109,409, filed August 9, 1949, by Roy F. Roberts, assigned to the same assignee as the present application, now Patent No. 3,031,288, there is disclosed a series of propellant substances that are formed by polymerization of polyester resins in which there have been intimately incorporated a solid oxidizer, such as ammonium perchlorate, or potassium perchlorate.

The burning rate of potassium perchlorate propellants is approximately 0.75 in./sec. at 1000 p.s.i. Potassium perchlorate propellants, however, are undesirable in some applications due to the fact that they produce solid particles in the exhaust gases. Ammonium perchlorate propellants do not produce solid materials in the combustion products, but have the disadvantage that they normally burn at relatively slow rates; for example, the ammonium perchlorate-polyester type of propellant generally burns at only approximately 0.25 in./sec. at 1000 p.s.i. pressure. This rate is often too slow for optimum performance in numerous applications and in these applications ammonium perchlorate propellants are not employed as much as the $KClO_4$ propellants in spite of the smoke from the latter.

I have discovered that it is possible to produce ammonium perchlorate-resin base propellants that have burning rates even above 0.40 in./sec. at 1000 p.s.i. by incorporating into the resin an organic compound compatible with the resin which has unreduced oxygen in its molecule, that is, oxygen that is bonded to an element other than carbon or hydrogen such as, for example, oxygen bonded to chlorine or nitrogen. Such compounds tend to increase the specific impulse as well as the burning rate of the material. A burning rate at least as high as 0.40 in./sec. at 1000 lbs. per square inch is herein called "rapid burning." By the term "a compound compatible with the resin" is meant a substance which can be added to the addition type resin and will blend with the resin without preventing the ultimate polymerization.

Examples of resins which are suitable in compounding my novel propellant are addition type polyester resins such as: a resin obtained by condensing 4.0 moles of sebacic acid, 1.0 mole of maleic anhydride, and 5.0 moles of propylene glycol, this being herein called Resin A; and a resin obtained by condensing 7.0 moles of adipic acid, 3.0 moles of maleic anhydride and 11.0 moles of diethylene glycol, this being herein called Resin B; and a resin obtained by condensing 7.0 moles of adipic acid, 3.0 moles of maleic anhydride and 12.0 moles of diethylene glycol, this being herein called Resin C; and a resin obtained by condensing 10.5 moles diethylene glycol, 9.0 moles adipic acid, 1.0 mole maleic anhydride, this being herein called Resin D; and a resin obtained by condensing 10.0 moles of diethylene glycol, 4.5 moles adipic acid, 4.5 moles azelaic acid and 1.0 mole maleic anhydride, this being herein called Resin E. Other resins, useful in the practice of this invention are the addition polymers of monomers such as diethylene glycol bis-(allyl carbonate); the acrylates, and methacrylates such as butyl acrylate, propyl acrylate, ethyl acrylate, methyl acrylate, methyl methacrylate, butyl methacrylate, propyl methacrylate, etc.; and diallyl compounds such as the diallyl ester of any dibasic acid. Examples are diallyl phthalate, diallyl maleate, diallyl fumarate, and diallyl diglycolate. In addition, these unsaturated compounds and mixtures thereof may be copolymerized with polyester resins such as those described above.

Although the polyesters in the foregoing examples are formed by a condensation reaction, further polymerization of the polyester takes place by an addition process. The term "addition type" resin as used herein means a resin in which the polymerization takes place by attachment of molecules to each other in progressive sequence and without formation of water or other by-products.

Compounds containing unreduced oxygen radicals, useful for my purpose, may be either polymerizable or non-polymerizable materials. Examples of unreduced oxygen radicals which are suitable for my invention are $NO_2$, $NO_3$, $ClO_3$, and $ClO_4$ radicals. Since the $ClO_3$ radical is rather unstable, $ClO_4$ is the preferred radical. Examples of some of the compounds which contain unreduced oxygen radicals are lower alkenyl ammonium perchlorates, such as allyl ammonium perchlorate 2-nitroethyl acrylate, the nitrobutyl acrylates, 2,2-dinitropropane, 2,2-dinitropropyl acrylate, 2,2,3,3-tetranitrobutyl acrylate, 2,2 - dinitropropyl methacrylate, 2,2,3,3-tetranitrobutyl methacrylate, 2,2-dinitropropane-1,3-diol; lower alkyl ammonium perchlorates, such as ethyl ammonium perchlorates, propyl ammonium perchlorates, isopropyl ammonium perchlorates, butyl ammonium perchlorates, etc., aryl ammonium perchlorates, such as phenyl ammonium perchlorates as well as nitro amine perchlorates or halo amine perchlorates.

A particularly desirable form of fuel for use in an ammonium perchlorate-resin base type of propellant is one having an unsaturated compound containing unreduced oxygen copolymerized with the polyester or addition type resin base. Some of the substances which are suitable for this purpose are unsaturated organic compounds having unreduced oxygen in the molecule such as allyl ammonium perchlorate, 2-nitroethyl acrylate, 2-nitrobutyl acrylate, 2,2-dinitropropyl acrylate, 2,2-dinitropropyl methacrylate, 2,2,3,3-tetranitrobutyl acrylate, 2,2,3,3-tetranitrobutyl methacrylate. These substances can be copolymerized with suitable quantities of resins having reduced oxygen, if desired, to form a thermosetting, or substantially thermosetting, type of resin which for many types of operations is preferable to a thermoplastic type of resin.

The compound containing unreduced oxygen may in some cases be polymerized by itself to form a satisfactory resin, or if the compound is not capable of polymerization it may be dissolved in a polymerizable material. The proportions of the unreduced oxygen-containing substance to the resin are not critical and may vary over a wide range. In fact, the beneficial effect of the unreduced oxygen-containing compound manifests itself even when only a small proportion of it is present and this effect is enhanced as the proportion of unreduced oxygen is increased.

Polymerization of the polyesters, or other addition resins, with vinyl and/or allyl type compounds, such as those named above, takes place by the vinyl type of polymerization. To insure polymerization it is necessary to employ catalysts which are capable of accelerating the rate of such vinyl type polymerization. These catalysts are ordinarily the organic peroxides and peresters. Examples of preferred catalysts are tertiary butyl perbenzoate, 1-hydroxycyclohexyl hydroperoxide-1, cumene hydroperoxide, cycloalkane hydroperoxide, ditertiary butyl diperphthalate, methyl amyl ketone peroxide and methyl ethyl ketone peroxide, etc.

In cases where the unsaturated hydrocarbon, or the unreduced oxygen-containing substance, is a highly nitrated material, it is preferable to conduct the polymerization at as low a temperature as possible to avoid decomposing the nitro compound. This is accomplished by employing an accelerator which causes the peroxide or perester to produce a large number of free radicals at low temperatures, which accelerate the polymerization. The accelerators normally used to activate the peroxide or perester catalysts are cobalt salts, such as cobalt octoate, cobalt naphthenate, cobalt resinate, cobalt linoleate, cobalt hexoate, cobalt heptonate and cobalt nonates. Other accelerators are the corresponding zinc, iron, aluminum, nickel, manganese and lead organic salts such as the octoate, naphthenate, resinate, linoate, hexoate, heptonate and nonate. Ammonium perchlorate also has the property of acting as an accelerator, therefore, in propellants compounded by using ammonium perchlorate the addition of any other accelerator is not always necessary.

After blending the mixture containing the addition type resin, unreduced oxygen compound, catalyst and accelerator the mixture is brought to the polymerization temperature which for the substances mentioned will range from 20° C. to 100° C. In cases where the mixture includes highly nitrated or oxidized compounds which are usually unstable at elevated temperatures the use of accelerators and catalysts will permit addition polymerization to occur for some substances at temperatures as low as 20° C. and polymerization in most cases will take place at temperatures below 60° C.

The ammonium perchlorate used in compounding the propellant may ordinarily vary within the limits of 70–80% by weight based on the weight of the total propellant. However, in no case shall the amount of ammonium perchlorate used exceed that amount necessary to oxidize all of the carbon atoms in the propellant to $CO_2$ and all of the hydrogen atoms to $H_2O$. The lower limit of ammonium perchlorate used shall be such that the total oxygen in the finished propellant shall be high enough to prevent the formation of solid carbon in the exhaust gases. The amount of ammonium perchlorate used is also dependent upon the desired characteristics of the finished propellant and the amount of oxygen in the binder polymer and additives.

An advantage of my invention is best illustrated by Table I which compares the burning rate of various compositions, with a substantially fixed proportion of ammonium perchlorate ranging from about 70%–80% by weight of the propellant. The numbers in the table with the exception of r represent percentages by weight.

*Table I*

| No. | NH₄ClO₄ | S | Resin B | Resin D | Resin E | AAP | CR-39 | BA | MA | MMA | NEA | DNPA | DAP | NC | r |
|---|---|---|---|---|---|---|---|---|---|---|---|---|---|---|---|
| 1 | 75 | 12.5 | 12.5 | | | | | | | | | | | | 0.26 |
| 2 | 76 | | | | | | 10.0 | | 12.9 | 1.1 | | | | | 0.28 |
| 3 | 75 | | | | | 7.5 | 7.1 | | 7.9 | 0.8 | | | | 1.7 | 0.63 |
| 4 | 75 | | | | | 7.5 | 1.38 | | 13.79 | 0.15 | | | | 2.18 | 0.52 |
| 5 | 75 | | | | | | 2.15 | | | 0.23 | 21.37 | | | 1.25 | 0.52 |
| 6 | 70 | | | | | | 0.50 | 7.0 | | | 17.5 | | | | 0.58 |
| 7 | 75 | | | 2.43 | | | 15.27 | | | | | 6.55 | 0.75 | | 0.465 |
| 8 | 80 | | | | 1.8 | | 11.2 | | | | | 6.6 | 0.4 | | 0.53 |

S is styrene.
Resin B is a polyester resin obtained by condensing 7.0 moles of adipic acid, 3.0 moles of maleic anhydride and 11.0 moles of diethylene glycol.
Resin D is a polyester resin obtained by condensing 10.5 moles diethylene glycol, 9.0 moles adipic acid, 1.0 mole maleic anhydride.
Resin E is a polyester resin obtained by condensing 10.0 moles diethylene glycol, 4.5 moles adipic acid, 4.5 moles azelaic acid, and 1.0 mole maleic anhydride.
AAP is allyl ammonium perchlorate.
CR-39 is diethylene glycol bis-(allyl carbonate).
BA is butyl acrylate.
MA is methyl acrylate.
MMA is methyl methacrylate.
NEA is nitroethyl acrylate.
DNPA is dinitropropyl acrlyate.
DAP is diallyl phthalate.
NC is nitrocellulose.
r is the burning rate in inches per second at 1000 pounds per square inch pressure.

Any unsaturated nitro compounds, or other compound having unreduced oxygen such as 2,2,3,3-tetranitrobutyl acrylate, etc., may be substituted for nitroethyl acrylate. Since some of the compounds listed above contain a larger amount of oxygen than others, it is possible to adjust the formulation so that a smaller amount of ammonium perchlorate will be required to provide the necessary oxygen for combustion.

In the foregoing table, Examples Nos. 1 and 2 are not within the scope of this invention, while the remaining Examples 3 to 8 are within the scope of this invention. Examples 1 and 2 are given to show how much slower the burning rates of propellants containing no unreduced oxygen in the fuel are than those having unreduced oxygen. Examples 1 and 2 show that even resins having substantial reduced oxygen such as CR-39, methyl acrylate and methyl methacrylate do not produce propellants having burning rates that are better than those of the polyester-styrene-ammonium perchlorate type of propellant shown in Example 1. As soon as unreduced oxygen is introduced into the polymerized molecule, however, as is the case in Examples 3, 4, 5 and 6, it is apparent that the burning rate increases materially. In the event that substances like 2,2-dinitro-1,3-propanediol, or 2,2-dinitropropane, which are not unsaturated, are to be employed, such substances can be substituted in place of some of the ammonium perchlorate if desired.

Nitrocellulose is employed in some of the formulations to improve the physical properties of the propellant and also at the same time to supply additional oxygen.

The advantages of my invention are that it is possible to produce ammonium perchlorate-resin-base propellants which do not produce any solid materials in the exhaust, have a burning rate which substantially approaches the burning rate of the potassium perchlorate type of propellants, and extends the use of the ammonium perchlorate propellants to operations where potassium perchlorate propellants have heretofore been considered superior.

I claim:

1. A rapid burning solid propellant charge comprising about 70%–85% by weight based on the weight of the total propellant of ammonium perchlorate, about 30%–15% by weight based on the weight of the total propellant of a resin base fuel, said resin base fuel comprising the addition polymerization product of an unsaturated unsubstituted lower carboxylic acid ester and nitrosubstituted lower alkyl ester of a lower alkenoic acid.

2. A rapid burning solid propellant charge comprising about 70%–85% by weight based on the weight of the total propellant of ammonium perchlorate, about 30%–15% by weight based on the weight of the total propellant of a resin base fuel, said resin base fuel comprising an unsaturated polyester resin consisting of the condensation product of a polyhydric alcohol and an unsaturated polycarboxylic acid heteropolymerized with a nitro-substituted lower alkyl ester of a lower alkenoic acid.

3. A rapid burning solid propellant charge comprising about 70%–85% by weight based on the weight of the total propellant of ammonium perchlorate, about 30%–15% by weight based on the weight of the total propellant of a resin base fuel, said resin base fuel comprising an unsaturated polyester resin consisting of the condensation product of a polyhydric alcohol, an unsaturated polycarboxylic acid heteropolymerized with a nitrosubstituted lower alkyl ester of a lower alkenoic acid, and nitrocellulose.

4. A rapid burning solid propellant charge comprising a cured intimate mixture of about 75% by weight based on the weight of the total propellant of ammonium perchlorate, and a fuel component comprising the polymerization product of about 6.5% by weight based on the weight of the total propellant of dinitropropyl acrylate, about 15.3% by weight based on the weight of the total propellant of butyl acrylate, about 0.8% by weight based on the weight of the total propellant of diallyl phthalate, and about 2.4% by weight based on the weight of the total propellant of a polyester resin, said polyester resin being a condensation product obtained by condensing 10.5 moles of diethylene glycol, 9.0 moles of adipic acid and 1.0 mole of maleic anhydride.

5. A rapid burning solid propellant charge comprising a cured intimate mixture of about 80% by weight based on the weight of the total propellant of ammonium perchlorate, and a fuel component comprising the polymerization product of about 6.6% by weight based on the weight of the total propellant of dinitropropyl acrylate, about 11.2% by weight based on the weight of the total propellant of butyl acrylate, about 0.4% by weight based on the weight of the total propellant of diallyl phthalate, and about 1.8% by weight based on the weight of the total propellant of a polyester resin, said polyester resin being the condensation product obtained by condensing 10.0 moles of diethylene glycol, about 4.5 moles of adipic acid, about 4.5 moles of azelaic and 1.0 mole of maleic anhydride.

6. A rapid burning solid propellant charge comprising a cured intimate mixture of about 75% by weight based on the weight of the total propellant of ammonium perchlorate, and a fuel component comprising the polymerization product of about 7.5% by weight based on the weight of the total propellant of allyl ammonium perchlorate, about 7.1% by weight based on the weight of the total propellant of diethylene glycol bis-(allyl carbonate), about 7.9% by weight based on the weight of the total propellant of methyl acrylate, about 0.8% by weight based on the weight of the total propellant of methyl methacrylate and 1.7% by weight based on the weight of the total propellant of nitrocellulose.

7. A rapid burning solid propellant charge comprising a cured intimate mixture of about 75% by weight based on the weight of the total propellant of ammonium perchlorate, and a fuel component comprising the polymerization product of about 2.2% by weight based on the weight of the total propellant of diethylene glycol bis-(allyl carbonate), about 0.2% by weight based on the weight of the total propellant of methyl methacrylate, about 21.4% by weight based on the weight of the total propellant of nitroethyl acrylate, and about 1.2% by weight based on the weight of the total propellant of nitrocellulose.

8. A rapid burning solid propellant charge comprising a cured intimate mixture of about 75% by weight based on the weight of the total propellant of ammonium perchlorate, and a fuel component comprising the polymerization product of about 0.5% by weight based on the weight of the total propellant of diethylene glycol bis-(allyl carbonate), about 7% by weight based on the weight of the total propellant of butyl acrylate and about 17.5% by weight based on the weight of the total propellant of nitro acrylate.

9. A rapid burning, solid, propellant charge which comprises a cured intimate mixture of from about 70% to 85%, by weight, of an oxygen rich substance selected from the group consisting of ammonium perchlorate and mixtures thereof with nitro-substituted lower alkanes, nitro-substituted lower alkanols, lower alkyl ammonium perchlorates; from about 30% to 15% of a fuel comprising the polymerization product of monomer selected from the group consisting of unsaturated polyester resins consisting of the condensation product of polyhydric alcohol and polycarboxylic acid, lower alkyl esters of lower alkenoic acids, lower alkenyl phthalates, lower alkenyl esters of lower alkenoic acids, diallyl diglycollate, diethylene glycol bis-(allyl carbonate), nitro-substituted lower alkyl esters of lower alkenoic acids, lower alkenyl ammonium perchlorates, and mixtures thereof; provided, that when said oxygen rich substance is ammonium perchlorate, said fuel component includes a polymerizable unreduced oxygen containing compound selected from the group consisting of nitro-substituted lower alkyl esters of lower alkenoic acids, lower alkenyl ammonium perchlorates and mixtures thereof.

10. A rapid burning, solid, propellant charge which comprises a cured intimate mixture of from about 70% to 85%, by weight, of an oxygen rich substance selected from the group consisting of ammonium perchlorate and mixtures thereof with nitro-substituted lower alkanes, nitro-substituted lower alkanols, lower alkyl ammonium perchlorates; from about 30% to 15% of a fuel comprising the polymerization product of monomer selected from the group consisting of unsaturated polyester resins consisting of the condensation product of a polyhydric alcohol and polycarboxylic acid, lower alkyl esters of lower alkenoic acids, lower alkenyl phthalates, lower alkenyl esters of lower alkenoic acids, diallyl diglycollate, diethylene glycol bis-(allyl carbonate), nitro-substituted lower alkyl esters of lower alkenoic acids, lower alkenyl ammonium perchlorates, and mixtures thereof; provided that when said oxygen rich substance is ammonium perchlorate, said fuel component includes a polymerizable unreduced oxygen containing compound selected from the group consisting of nitro-substituted lower alkyl esters of lower alkenoic acids, lower alkenyl ammonium perchlorates and mixtures thereof; and nitrocellulose.

11. The propellant charge of claim 9 wherein there is incorporated a polymerization catalyst selected from the group consisting of organic peroxides and peresters.

12. The propellant charge of claim 9 wherein there is incorporated a polymerization catalyst selected from the group consisting of organic peroxides and peresters, and an acceleration catalyst comprising a heavy metal salt of an organic acid.

13. A rapid burning solid propellant charge comprising a cured intimate mixture of from about 70% to 85%, by weight, ammonium perchlorate and from about 30% to 15% of a fuel component comprising an unsaturated polyester resin consisting of the condensation product of a polyhydric alcohol and polycarboxylic acid, heteropolymerized with a mixture of lower alkyl esters of lower alkenoic acids, lower alkenyl phthalate, and nitro-substituted lower alkyl esters of lower alkenoic acids.

14. A rapid burning solid propellant charge comprising a cured intimate mixture of from about 70% to 85%, by weight, ammonium perchlorate and from about 30% to 15% of a fuel component comprising the polymerization product of a mixture of diethylene glycol bis-(allyl carbonate), lower alkyl esters of lower alkenoic acids and nitro-substituted lower alkyl esters of lower alkenoic acids.

15. A rapid burning solid propellant charge comprising a cured intimate mixture of from about 70% to 85%, by weight, ammonium perchlorate and from about 30% to 15% of a fuel component comprising the polymerization product of a mixture of alkenyl ammonium perchlorate, diethylene glycol bis-(allyl carbonate), and lower alkyl esters of lower alkenoic acids.

References Cited in the file of this patent

UNITED STATES PATENTS

| | | |
|---|---|---|
| 2,255,313 | Ellis | Sept. 9, 1941 |
| 2,388,319 | Fuller | Nov. 6, 1945 |
| 2,404,688 | Bruson et al. | July 23, 1946 |
| 2,416,639 | Pearsall | Feb. 25, 1947 |
| 2,443,613 | Fuller | June 22, 1948 |
| 2,443,735 | Kropa | June 22, 1948 |
| 2,472,963 | Singleton et al. | June 14, 1949 |
| 2,479,470 | Carr | Aug. 16, 1949 |
| 2,479,828 | Geckler | Aug. 23, 1949 |
| 2,485,294 | Kropa | Oct. 18, 1949 |

FOREIGN PATENTS

| | | |
|---|---|---|
| 248,089 | Great Britain | Mar. 1, 1926 |
| 579,057 | Great Britain | July 22, 1946 |

OTHER REFERENCES

McLarren: "Rocket Engine Fuels," Automotive and Aviation Industries, August 15, 1946, pages 20–23 and 76.

Wheeler et al.: "Solid and Liquid Propellants," Journal of the Institute of Fuel, June 1947, No. 114, pages 137–159 inclusive.